US011598381B2

(12) United States Patent
Kato et al.

(10) Patent No.: US 11,598,381 B2
(45) Date of Patent: Mar. 7, 2023

(54) CLUTCH AND VEHICLE MOTIVE POWER TRANSMISSION STRUCTURE

(71) Applicant: UNIVANCE CORPORATION, Kosai (JP)

(72) Inventors: Tadahiko Kato, Kosai (JP); Hideya Ooike, Kosai (JP); Yoshihiro Asada, Kosai (JP)

(73) Assignee: UNIVANCE CORPORATION, Kosai (JP)

( * ) Notice: Subject to any disclaimer, the term of this patent is extended or adjusted under 35 U.S.C. 154(b) by 277 days.

(21) Appl. No.: 16/638,324

(22) PCT Filed: Sep. 6, 2017

(86) PCT No.: PCT/JP2017/032063
§ 371 (c)(1),
(2) Date: Feb. 11, 2020

(87) PCT Pub. No.: WO2019/049231
PCT Pub. Date: Mar. 14, 2019

(65) Prior Publication Data
US 2020/0224733 A1 Jul. 16, 2020

(51) Int. Cl.
*F16D 11/14* (2006.01)
*F16D 21/08* (2006.01)
(Continued)

(52) U.S. Cl.
CPC .............. *F16D 21/08* (2013.01); *B60K 6/387* (2013.01); *F16D 11/14* (2013.01);
(Continued)

(58) Field of Classification Search
CPC .......... F16D 21/08; F16D 11/14; F16D 13/52; F16D 23/12; F16D 2023/123;
(Continued)

(56) References Cited

U.S. PATENT DOCUMENTS

| 5,918,715 A | 7/1999 | Ruth et al. |
| 8,296,020 B2 * | 10/2012 | Lee .......................... B60K 6/383 |
| | | 180/65.21 |

(Continued)

FOREIGN PATENT DOCUMENTS

| CN | 1857837 A | 11/2006 |
| CN | 104246265 A | 12/2014 |

(Continued)

OTHER PUBLICATIONS

Extended (Supplementary) European Search Report dated Dec. 3, 2020, issued in counterpart EP Application No. 17924293.8. (6 pages).

(Continued)

*Primary Examiner* — Timothy Hannon
(74) *Attorney, Agent, or Firm* — WHDA, LLP

(57) ABSTRACT

Provided is a clutch that is able to not only transmit torque smoothly even when an input shaft and an output shaft significantly differ in relative speed and phase, but also reduce an energy loss during torque transmission. The clutch (10) includes a dog clutch (40) for transmitting forward or reverse torque from the input shaft (11) to the output shaft (12), and a friction clutch (20) for transmitting torque from the input shaft (11) to the output shaft (12) and disposed in parallel with the dog clutch (40), and selectively transmits or interrupts torque between the input shaft (11) and the output shaft (12).

6 Claims, 7 Drawing Sheets

(51) Int. Cl.
  *B60K 6/387* (2007.10)
  *F16D 13/52* (2006.01)
(52) U.S. Cl.
  CPC ..... *B60Y 2200/92* (2013.01); *B60Y 2400/421* (2013.01); *B60Y 2400/4244* (2013.01); *F16D 13/52* (2013.01)
(58) Field of Classification Search
  CPC .. F16D 2023/4114; F16D 41/16; F16D 43/20; F16D 41/125; F16D 47/00; B60K 6/387; B60Y 2200/92; B60Y 2400/421; B60Y 2400/4244
  See application file for complete search history.

(56) References Cited

U.S. PATENT DOCUMENTS

| | | | |
|---|---|---|---|
| 8,746,426 B2* | 6/2014 | Petzold | F16D 25/061 192/85.48 |
| 10,036,434 B2 | 7/2018 | Yasui et al. | |
| 11,047,429 B2* | 6/2021 | Nose | F16D 48/064 |
| 2002/0029947 A1 | 3/2002 | Imamura | |
| 2007/0272508 A1 | 11/2007 | Toya et al. | |
| 2009/0218190 A1* | 9/2009 | Reuschel | F16D 25/087 192/85.51 |
| 2012/0165146 A1* | 6/2012 | Samie | F16D 28/00 475/5 |
| 2015/0096859 A1 | 4/2015 | Isoda et al. | |
| 2016/0230850 A1 | 8/2016 | Kanada et al. | |
| 2016/0325730 A1* | 11/2016 | Ono | B60K 6/442 |
| 2016/0325752 A1* | 11/2016 | Ono | B60W 30/20 |
| 2018/0010668 A1* | 1/2018 | Hirano | F16H 57/082 |
| 2018/0236988 A1* | 8/2018 | Shimanaka | B60T 7/22 |
| 2018/0236998 A1* | 8/2018 | Ono | B60W 10/02 |

FOREIGN PATENT DOCUMENTS

| | | |
|---|---|---|
| CN | 105531137 A | 4/2016 |
| DE | 102009028518 A1 | 2/2011 |
| JP | 44-5884 A | 3/1969 |
| JP | 5-45855 Y2 | 11/1993 |
| JP | 2000-310260 A | 11/2000 |
| JP | 2001193760 A | 7/2001 |
| JP | 2004-144163 A | 5/2004 |
| JP | 3681943 B2 | 8/2005 |
| JP | 2007-315558 A | 12/2007 |
| JP | 2016-37252 A | 3/2016 |
| JP | 6209608 B2 | 10/2017 |
| WO | 2006/110945 A1 | 10/2006 |
| WO | 2011018436 A1 | 2/2011 |
| WO | 2015/001642 A1 | 1/2015 |

OTHER PUBLICATIONS

International Search Report dated Dec. 12, 2017, issued in counterpart International Application No. PCT/JP2017/032063 (2 pages).
Written Opinion (Form PCT/ISA/237) of the International Searching Authority dated Dec. 12, 2017, issued in counterpart International Application No. PCT/JP2017/032063 (4 pages).
Office Action dated Sep. 2, 2020, issued in counterpart CN Application No. 201780093408.X, with English Translation. (14 pages).
Office Action dated Apr. 27, 2021, issued in counterpart JP Application No. 2019-540176, with English Translation. (8 pages).

* cited by examiner (a)

(b)

(a)

(b)

(c)

CLUTCH AND VEHICLE MOTIVE POWER TRANSMISSION STRUCTURE

TECHNICAL FIELD

The present invention relates to a clutch for transmitting or interrupting torque between an input shaft and an output shaft. The present invention also relates to a vehicle motive power transmission structure.

BACKGROUND ART

A friction clutch for transmitting torque by using a friction force is known. A vehicle motive power transmission structure disclosed in Patent Literature 1 is such that a friction clutch is disposed between an input shaft and an output shaft in a situation where engine torque is inputted to the input shaft and electric motor torque is inputted to the output shaft.

CITATION LIST

Patent Literature

Patent Literature 1: Japanese Unexamined Patent Application Publication No. 2016-37252

SUMMARY OF INVENTION

Technical Problems

The above-mentioned conventional technology synchronizes the input shaft and the output shaft by applying a pressure load to a friction material of the friction clutch. However, the pressure load needs to be continuously applied in order to transmit torque with the input shaft coupled to the output shaft. This causes a problem where the continuous application of the pressure load results in an energy loss.

Meanwhile, a dog clutch achieves engagement by mechanical meshing. However, the dog clutch causes a problem where the input shaft and the output shaft cannot be synchronized. Further, although no pressure load needs to be applied after synchronization, meshing is difficult to achieve when the input shaft and the output shaft significantly differ in relative speed and phase. This results in the generation of shock or an inability to transmit torque.

The present invention has been made to solve the above problems. An object of the present invention is to provide a clutch and a vehicle motive power transmission structure that are able to not only transmit torque smoothly even when the input shaft and the output shaft significantly differ in relative speed and phase, but also reduce the energy loss during torque transmission.

Solution to Problems

In accomplishing the above object, a clutch according to the present invention selectively transmits or interrupts torque between an input shaft and an output shaft. The clutch includes a dog clutch and a friction clutch. The dog clutch transmits forward or reverse torque from the input shaft to the output shaft. The friction clutch is disposed in parallel with the dog clutch and adapted to transmit torque from the input shaft to the output shaft.

A vehicle motive power transmission structure according to the present invention includes the clutch according to the present invention, and is configured such that engine torque is inputted to the input shaft while electric motor torque is inputted to the output shaft.

Advantageous Effects of Invention

According to the clutch defined in a first aspect of the present invention, the dog clutch transmits forward or reverse torque from the input shaft to the output shaft. The friction clutch, which transmits torque from the input shaft to the output shaft, is disposed in parallel with the dog clutch. Therefore, even when the input shaft and the output shaft significantly differ in relative speed and phase, the friction clutch can be engaged to transmit torque smoothly. When the friction clutch engages the input shaft with the output shaft and thus reduces the difference in relative speed and phase between the input and output shafts, the dog clutch can be easily engaged. When the friction clutch is disengaged after the dog clutch is engaged, no pressure load needs to be applied to the friction clutch. Consequently, it is possible to not only transmit torque smoothly even when the input shaft and the output shaft significantly differ in relative speed and phase, but also reduce the energy loss during torque transmission. Further, as the friction clutch and the dog clutch are disposed in parallel, it is possible to avoid an excessive axial dimension of the clutch.

According to the clutch defined in a second aspect of the present invention, the dog clutch is configured such that a first member having a predetermined first surface is to be coupled to the output shaft. A second member having a second surface is to be coupled to the input shaft. The second surface axially opposes the first surface. A first engagement element disposed between the first surface and the second surface not only interrupts the transmission of reverse torque from the second member to the first member, but also engages the first member with the second member to transmit forward torque from the second member to the first member. A second engagement element disposed between the first surface and the second surface not only interrupts the transmission of forward torque from the second member to the first member, but also engages the first member with the second member to transmit reverse torque from the second member to the first member.

The first engagement element and the second engagement element are respectively pressed by springs in an axial direction in which the first engagement element and the second engagement element become engaged. Therefore, when the difference in relative speed and phase between the input shaft and the output shaft is small, the first engagement element or the second engagement element engages with the first member and the second member. Consequently, in addition to the advantageous effects provided by the first aspect, it is possible to smoothly engage the dog clutch. Further, as the mechanism of the dog clutch can be simplified, it is possible to avoid an excessive axial dimension.

A drive device deforms the spring in such a manner that the first engagement element and the second engagement element are unable to engage with each other. Therefore, it is possible to idle the second member with respect to the first member. When disabling the first engagement element and the second engagement element from engaging with each other, the drive device simply needs to overcome the elastic force of the spring that presses the first engagement element or the second engagement element. This makes it possible to reduce the energy required of the drive device.

According to the clutch defined in a third aspect of the present invention, the dog clutch includes a restriction member. When the forward rotation speed of the second member is higher than that of the first member, the restriction member disables the first engagement member from engaging and enables the second engagement member to become engaged. When the forward rotation speed of the first member is higher than that of the second member while the second engagement element is engaged, the restriction member enables the first engagement element to become engaged. Consequently, in addition to the advantageous effects provided by the second aspect, it is possible to transmit forward torque from the second member to the first member through the first engagement element when the rotation speed of the second member is higher than that of the first member after the first engagement element is engaged.

According to the clutch defined in a fourth aspect of the present invention, a transmission mechanism transmits the output of an actuator to the spring and the friction clutch. The actuator operates the friction clutch and the dog clutch. This eliminates the necessity of using actuators dedicated to the friction clutch and the dog clutch. Consequently, in addition to the advantageous effects provided by the second aspect or the third aspect, it is possible to downsize the clutch by an amount equivalent to the volume of unused dedicated actuators.

According to the clutch defined in a fifth aspect of the present invention, the drive device first enables the second engagement element to become engaged, and then cancels the transmission of the output of the actuator to the friction clutch. This makes it possible to prevent the friction clutch from being engaged for an excessive period of time. Consequently, in addition to the advantageous effects provided by the fourth aspect, it is possible to reduce the energy required for friction clutch engagement.

According to the clutch defined in a sixth aspect of the present invention, while the first engagement element or the second engagement element is engaged with the first member and the second member, the transmission mechanism disables the drive device from operating the first engagement element and the second engagement element in a state where the friction clutch is disengaged. Consequently, in addition to the advantageous effects provided by the fourth aspect or the fifth aspect, it is possible to maintain a state where the first engagement element or the second engagement element is engaged with the first member and the second member without requiring the application of the pressure load to the friction clutch.

According to a seventh aspect of the present invention, there is provided a vehicle motive power transmission structure including the clutch defined in one of the first to sixth aspects. The torque of an engine is inputted to the input shaft, and the torque of an electric motor is inputted to the output shaft. The clutch is disposed between the input shaft and the output shaft. Consequently, even when the engine or the electric motor is started or stopped, it is possible to smoothly switch from one torque transmission path to another.

Figure 4:
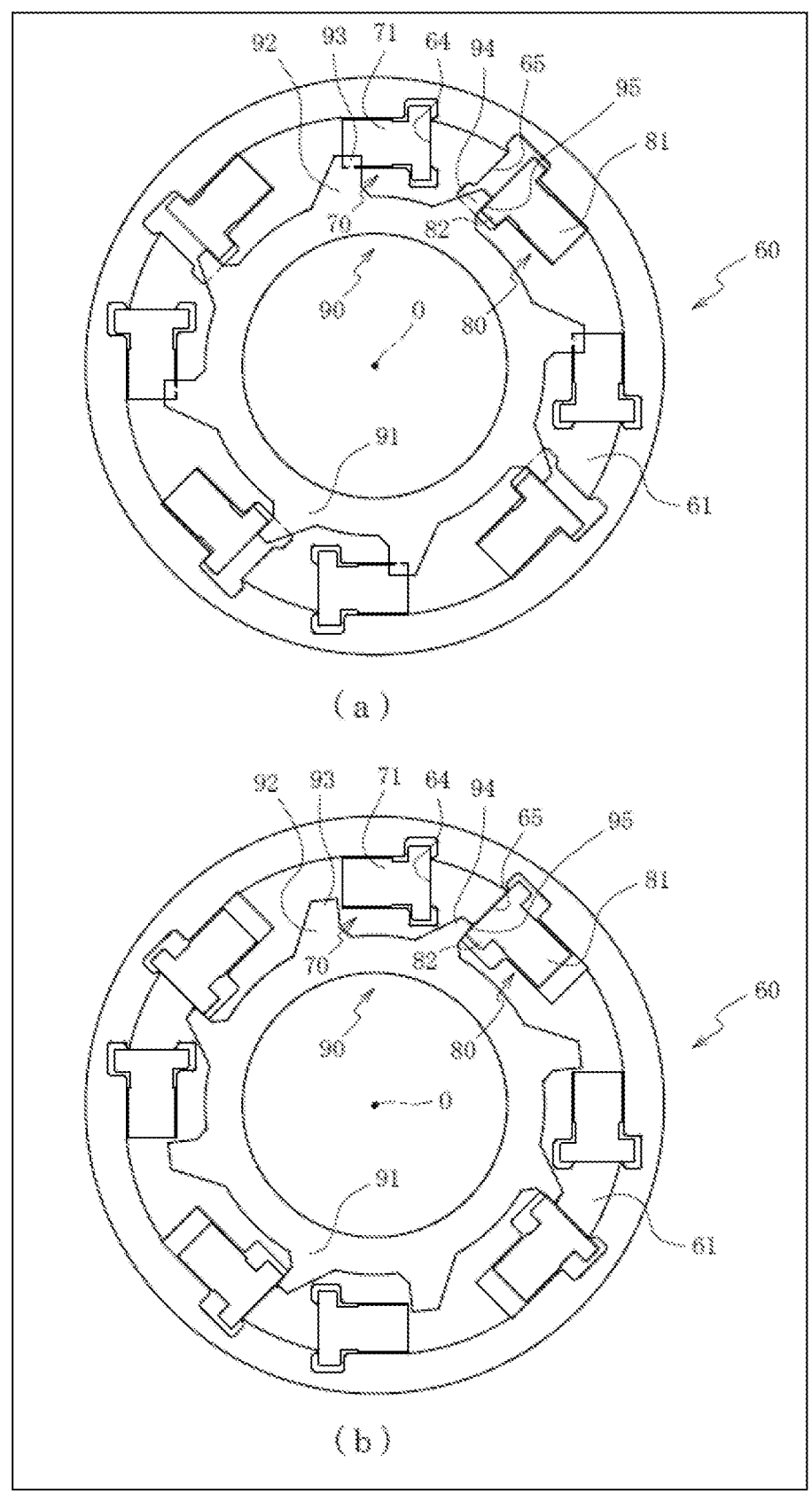

(a) of FIG. 4 is a rear view illustrating the second member that is obtained by assembling the first engagement element, a second engagement element, and a restriction member. (b) is a rear view illustrating the second member that is obtained by assembling the first engagement element, the second engagement element, and the restriction member and by sliding the restriction member.

Figure 5:
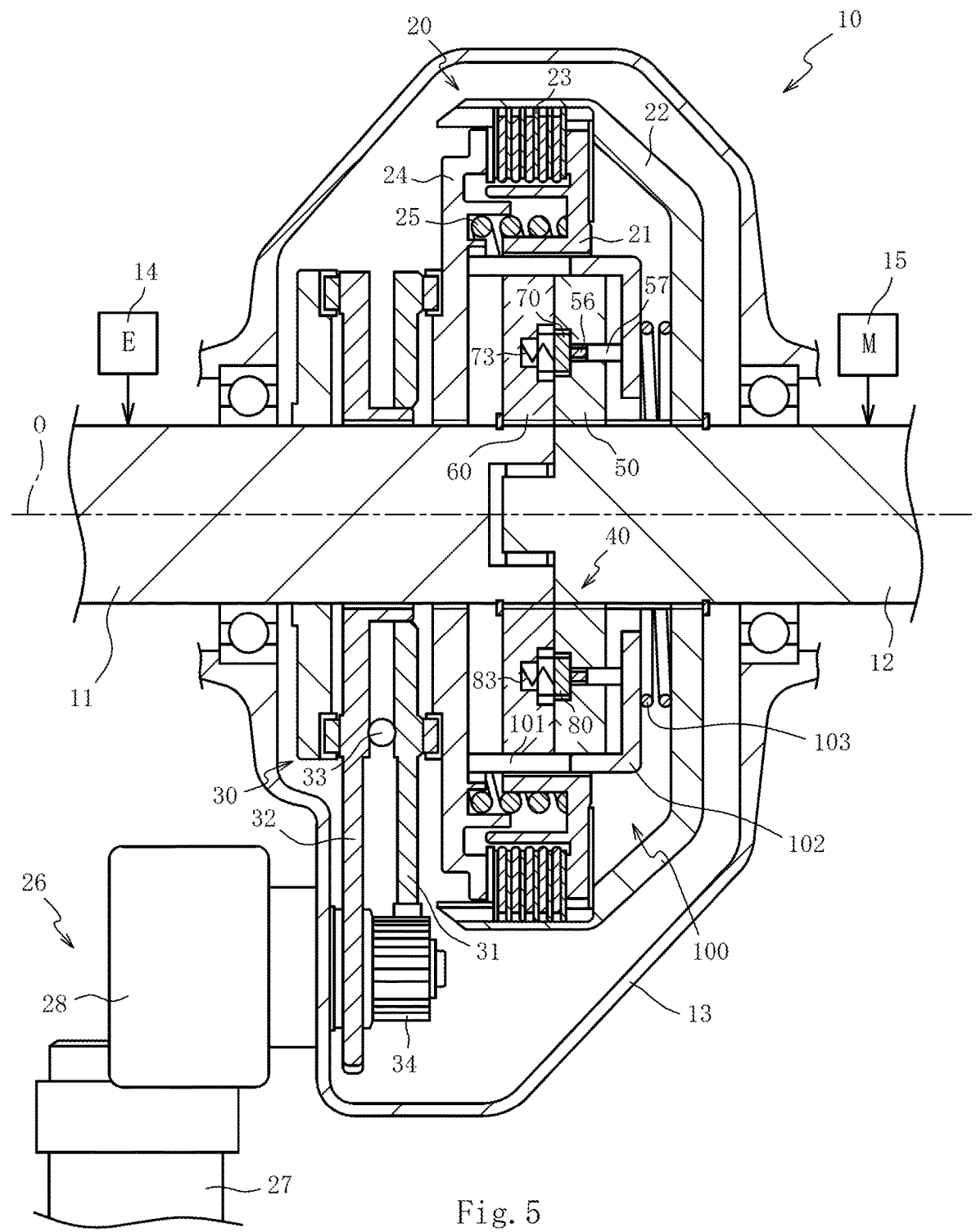
Figure 6:
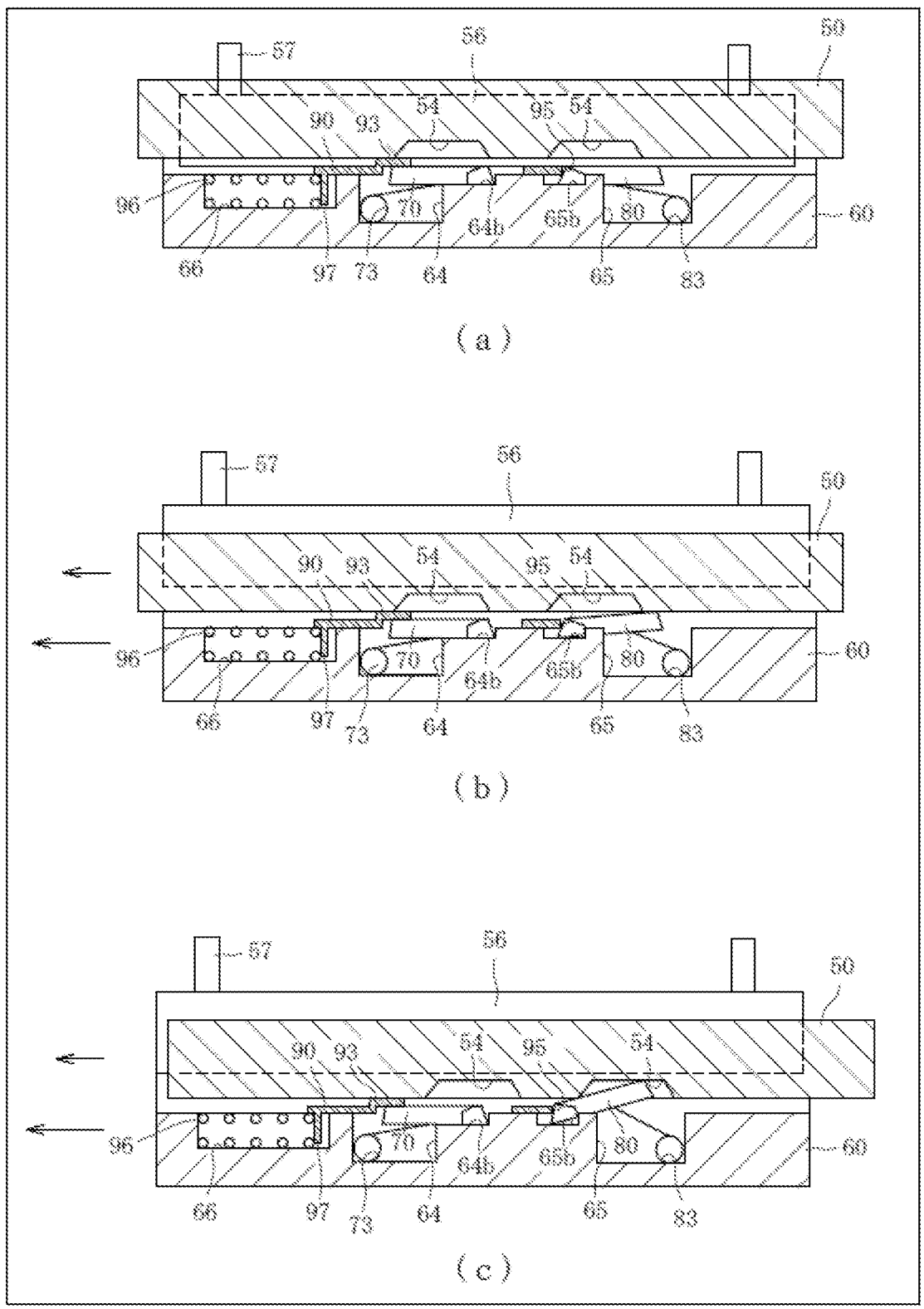

FIG. 5 is a cross-sectional view illustrating the clutch.
(a) of FIG. 6 is a schematic diagram illustrating a dog clutch in a state where the swing of the first and second engagement elements is restricted. (b) and (c) are schematic diagrams illustrating the dog clutch in a state where the swing of the first and second engagement elements is permitted.

Figure 7:
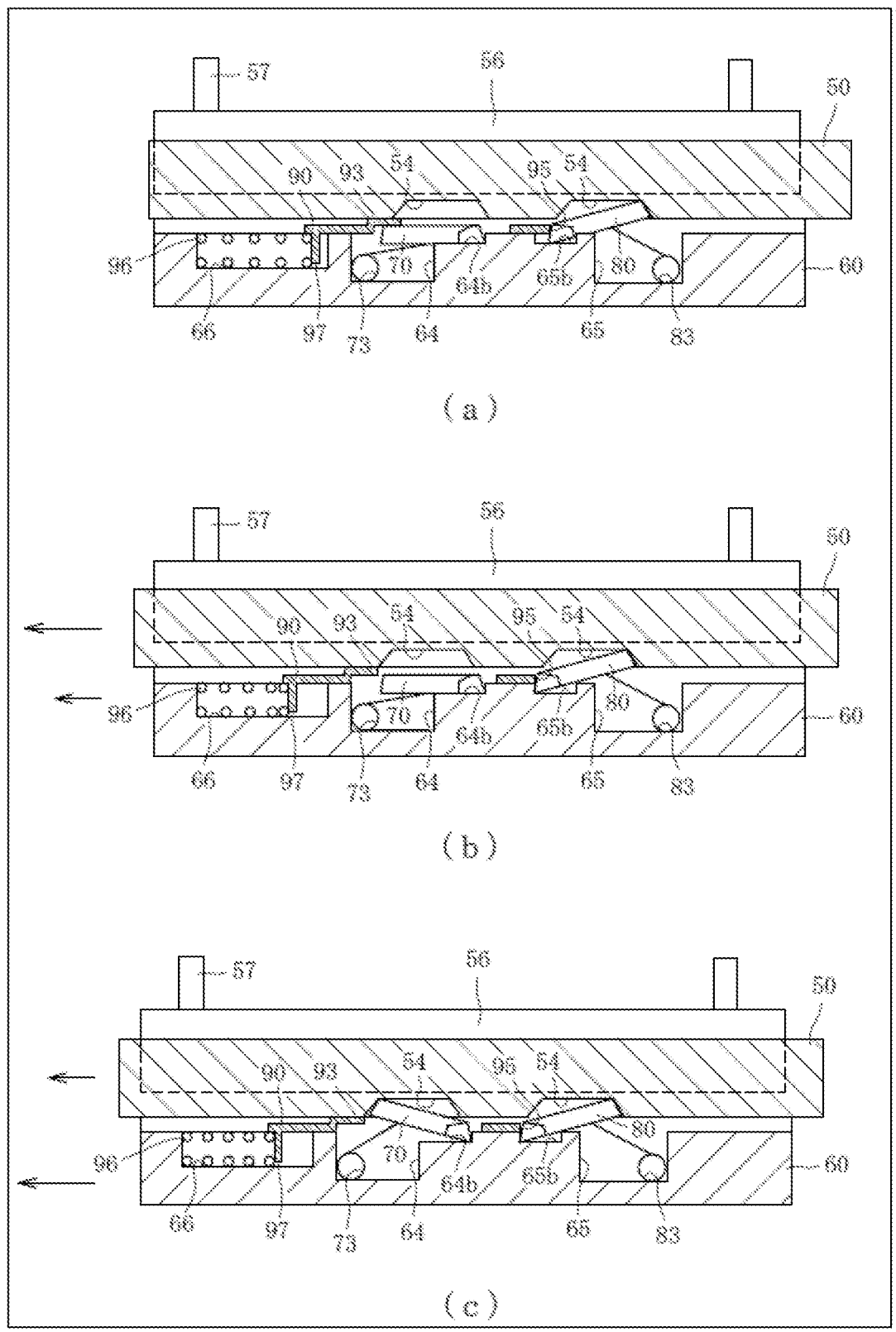

(a) of FIG. 7 is a schematic diagram illustrating the dog clutch with the second engagement element engaged in a concave. (b) and (c) are schematic diagrams illustrating the dog clutch in a state where the second member relatively rotates in forward direction with respect to the first member while the swing of the first and second engagement elements is permitted.

DESCRIPTION OF EMBODIMENTS

Figure 1:
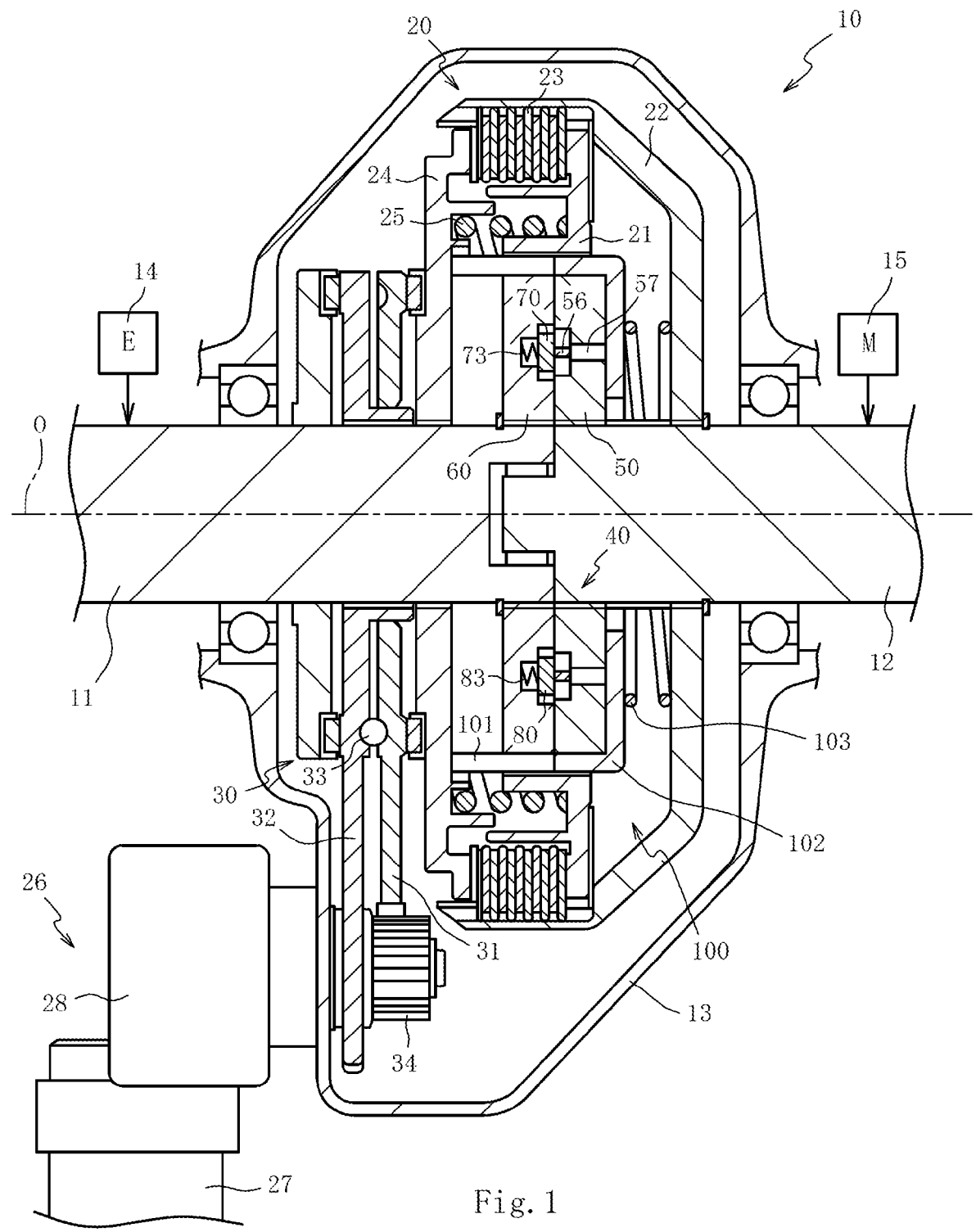
FIG. 1 is a cross-sectional view illustrating a clutch according to an embodiment of the present invention.

Preferred embodiments of the present invention will now be described with reference to the accompanying drawings. First of all, a schematic configuration of a clutch 10 will be described with reference to FIG. 1. FIG. 1 is an axial cross-sectional view illustrating the clutch 10 according to an embodiment of the present invention.

As illustrated in FIG. 1, the clutch 10 is a device that selectively transmits or interrupts torque between an input shaft 11 and an output shaft 12. The output shaft 12 is placed on the axis O of the input shaft 11 and pivotally disposed with respect to the input shaft 11. In the present embodiment, the torque of an engine 14 is inputted to the input shaft 11 through a transmission (not depicted), and the torque of an electric motor 15 is inputted to the output shaft 12. The clutch 10 includes a friction clutch 20 and a dog clutch 40. The friction clutch 20 and the dog clutch 40 are housed in a case 13 filled with a lubricating oil.

The friction clutch 20 includes a clutch hub 21, a clutch drum 22, and a clutch plate 23. The clutch hub 21 is to be coupled to the input shaft 11. The clutch drum 22 is to be coupled to the output shaft 12. The clutch plate 23 is disposed between the clutch drum 22 and the clutch hub 21. In the present embodiment, the clutch hub 21 is coupled to the outer circumference of a second member 60 of the dog clutch 40. The clutch plate 23 is disposed on a radial overlap between the clutch hub 21 and the clutch drum 22, and axially movably supported by the clutch hub 21 and the clutch drum 22.

A pressure member 24 adjusts the force that is exerted by the clutch plate 23 to fasten the clutch hub 21 to the clutch drum 22. A spring 25 disposed between the clutch hub 21 and the clutch drum 22 presses the pressure member 24 in the direction of releasing the transmission of torque. An actuator 26 drives the pressure member 24 in order to move it in the direction of the axis O in which the clutch plate 23 is pressed, and thus increase the torque transmitted by the clutch plate 23. In the present embodiment, the friction clutch 20 is a wet multi-plate clutch (disc clutch) having a disc-shaped engagement surface.

The actuator 26 includes an electric motor 27 and a reducer 28. The reducer 28 reduces the speed of the output from the electric motor 27. The reducer 28 is fastened to the case 13, and the electric motor 27 is fastened to the case 13 through a bracket (not depicted). Rotary motion of the electric motor 27 is converted to linear motion by a ball cam 30.

The ball cam 30 steplessly and accurately adjusts the fastening force of the clutch plate 23. The ball cam 30 includes a first plate 31, a second plate 32, and a ball 33. The first plate 31 is disposed on a driving side. The second plate 32 and the ball 33 are disposed on a reaction force side. The first plate 31 and the second plate 32 are rotatably supported by the outer circumference of the input shaft 11. The axial motion of the second plate 32 with respect to the input shaft 11 is restricted, and the first plate 31 faces the pressure member 24 through a thrust bearing. The tip of the first plate 31 meshes with a gear 34 that is connected to the output shaft of the reducer 28. A plurality of grooves having a predetermined phase difference are formed on cam surfaces that the first plate 31 and the second plate 32 mutually oppose, and are disposed on the same circumference centered around the axis O. The ball 33 is rotatably sandwiched between the cam surfaces.

In a case where the friction clutch 20 is to be fastened, rotating the first plate 31 with respect to the second plate 32 through the gear 34 of the reducer 28 moves the first plate 31 toward the pressure member 24 while receiving a pressing force of the ball 33. When the first plate 31 presses the pressure member 24 toward the axis O, the pressure member 24 presses the clutch plate 23. Meanwhile, in a case where the friction clutch 20 is to be unfastened, rotating the gear 34 of the reducer 28 in an opposite direction moves the first plate 31 away from the pressure member 24. The spring 25 then presses the pressure member 24 toward the first plate 31 by the amount of movement of the first plate 31. Therefore, the pressure member 24 decreases the force of pressing the clutch plate 23.

The dog clutch 40 includes a first member 50, the second member 60, a first engagement element 70, a second engagement element 80, springs 73, 83, and a transmission mechanism 100. The first member 50 is to be coupled to the output shaft 12. The second member 60 is to be coupled to the input shaft 11. The first engagement element 70 and the second engagement element 80 engage the first member 50 and the second member 60. The springs 73, 83 respectively press the first engagement element 70 and the second engagement element 80 in the direction of engaging the first member 50 and the second member 60. The transmission mechanism 100 disables the first engagement element 70 and the second engagement element 80 from engaging against the elastic force of the springs 73, 83.

Figure 2:
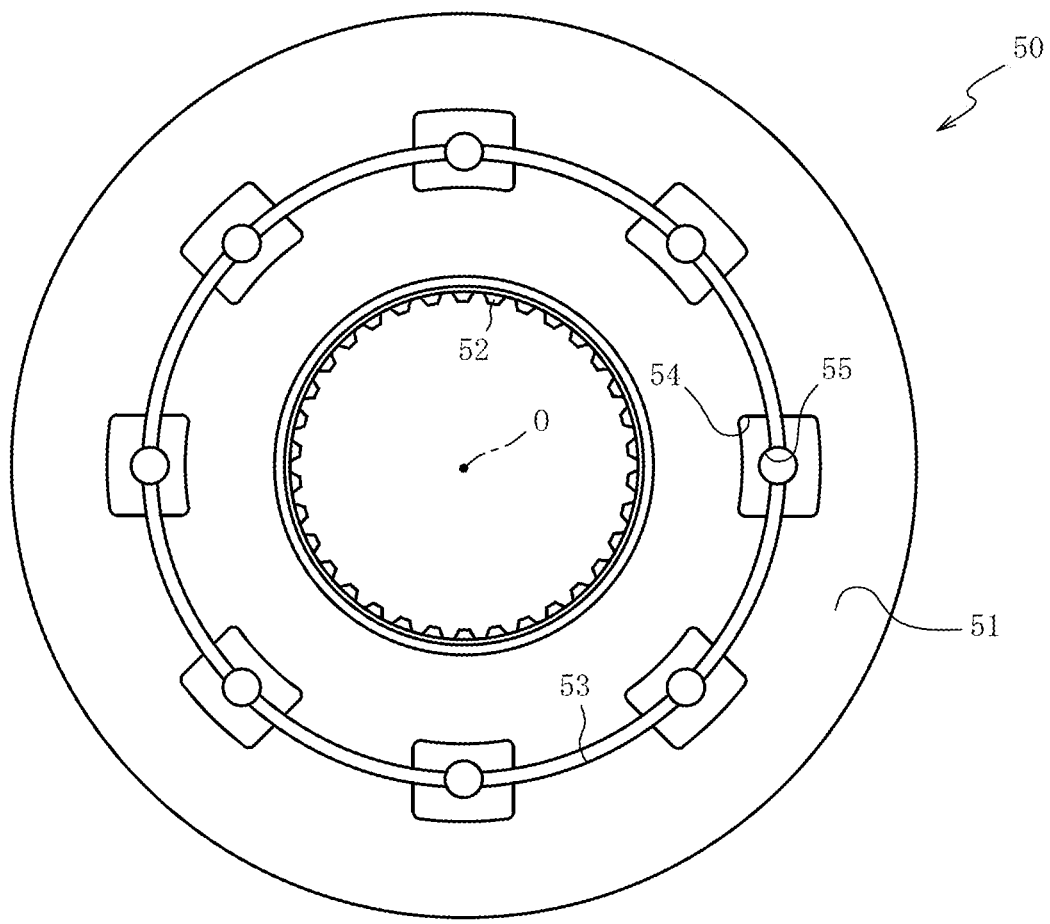
FIG. 2 is a front view illustrating a first member.
(a) of FIG. 3 is a rear view illustrating a second member. (b) is a rear view illustrating a first engagement element. (c) is a side view illustrating the first engagement element.

The first member 50 will now be described with reference to FIG. 2. FIG. 2 is a front view of the first member 50. The first member 50 has a first surface 51, and is substantially shaped like a ring. The first surface 51 is a flat surface orthogonal to the axis O. The first member 50 is to be coupled to the output shaft 12 by a spline 52 that is extended in the direction of the axis O.

The first member 50 is configured such that a ring-shaped groove 53 is formed on the first surface 51. The first surface 51 is such that a plurality of concaves 54 (eight concaves in the present embodiment) are formed on the groove 53. The first member 50 is such that through-holes 55 are formed in the groove 53 within the concaves 54. The through-holes 55 penetrate the first member 50 in the direction of thickness (in the direction of the axis O).

The concaves 54 are regions that the first engagement element 70 and the second engagement element 80 enter. The first engagement element 70 and the second engagement element 80 are swingably supported by the second member 60. The concaves 54 each have a substantially rectangular opening as viewed from front, and are formed at substantially equal intervals on the circumference of the groove 53. The radial width of the concaves 54 is slightly greater than the width of a main body 71 of the first engagement element 70 and the width of a main body 81 of the second engagement element 80 (these main bodies 71, 81 will be described later). This permits the main bodies 71, 81 to enter the concaves 54.

The groove 53 is a region for accommodating a ring member 56 (see FIG. 1) in such a manner as to permit the ring member 56 to move in the circumferential direction and in the direction of the axis O. The groove 53 is shaped like a rectangular cross-section in a cross-section containing the axis O. The through-holes 55 are regions into which pins 57 (see FIG. 1) slidably fit. The pins 57 transmit the force of the transmission mechanism 100 to the ring member 56. The ring member 56 restricts the swing of the first engagement element 70 and second engagement element 80.

Figure 3:
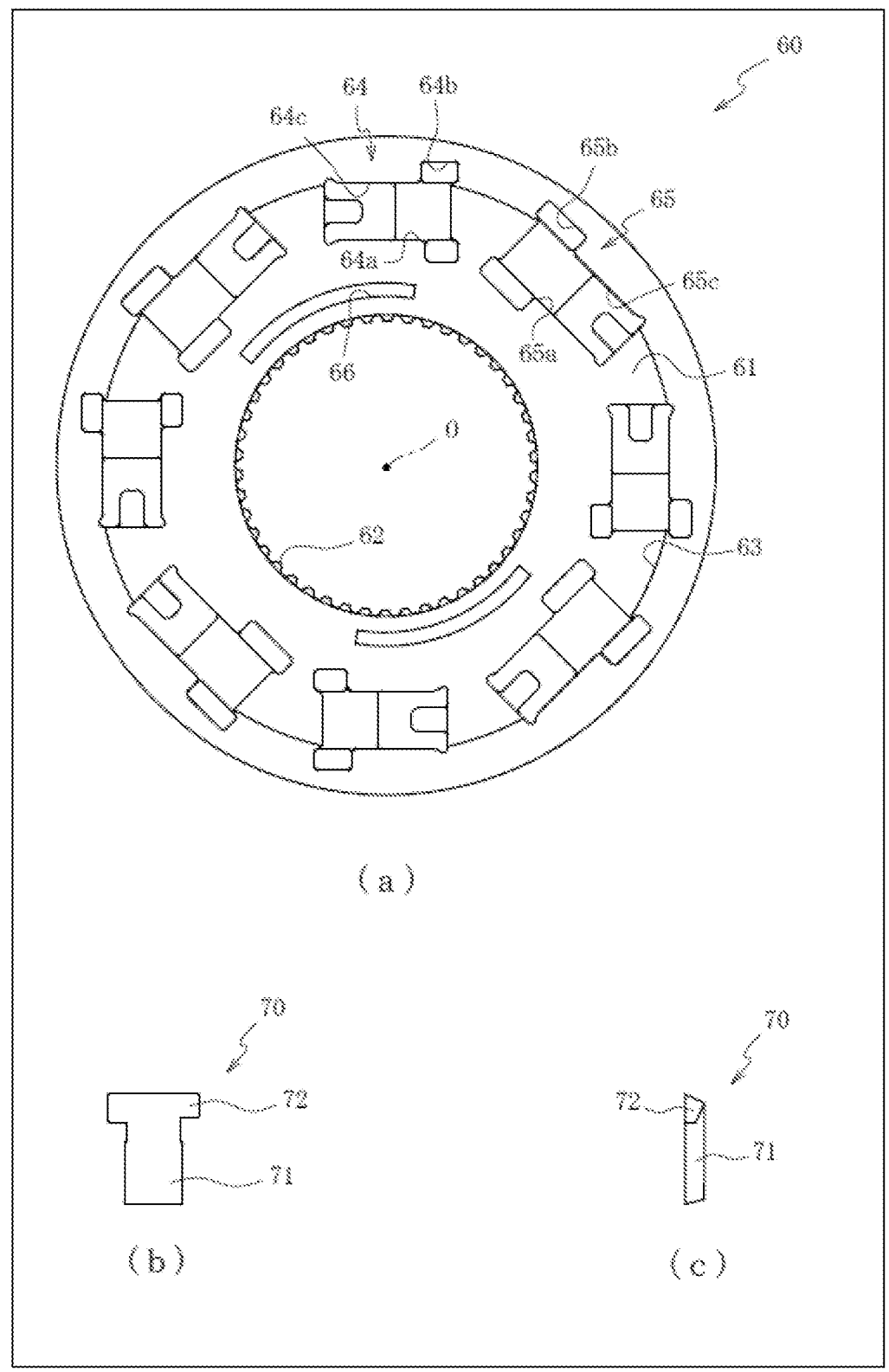

The second member 60 will now be described with reference to FIG. 3(a). FIG. 3(a) is a rear view of the second member 60. The second member 60 has a second surface 61, and is substantially shaped like a ring. The second surface 61 is a flat surface orthogonal to the axis O. The second surface 61 opposes the first surface 51 of the first member 50 in the direction of the axis O. The second member 60 is to be coupled to the input shaft 11 by a spline 62 that is extended in the direction of the axis O.

The second member 60 is configured such that a ring-shaped wall 63 is formed around the second surface 61 so as to surround the second surface 61. A restriction member 90 (described later) is disposed on the second surface 61 inside the wall 63. The second surface 61 is configured such that a plurality of first concaves 64 and second concaves 65 (a total of eight concaves in the present embodiment) are formed at positions corresponding to those of the concaves 54 formed on the first surface 51 (see FIG. 2). The first engagement element 70 and the spring 73 are accommodated in the first concaves 64, and the second engagement element 80 and the spring 83 are accommodated in the second concaves 65. The first concaves 64 and the second concaves 65 are alternately disposed in the circumferential direction of the second surface 61.

The first engagement element 70 and the second engagement element 80 will now be described with reference to FIGS. 3(b) and 3(c). FIG. 3(b) is a rear view of the first engagement element 70. FIG. 3(c) is a side view of the first engagement element 70. The first engagement element 70 and the second engagement element 80 have the same configuration except that they differ in the orientation in which they are circumferentially disposed on the second member 60. Therefore, various sections of the first engagement element 70 will be described without describing those of the second engagement element 80.

The first engagement element 70 is a substantially T-shaped plate as viewed from front, and includes a main body 71 and an arm 72. The main body 71 is substantially shaped like a rectangle as viewed from front. The arm 72 is substantially shaped like a stick, and protruded bilaterally from both edges of the end of the main body 71. The direction of torque transmitted by the first engagement element 70 is different from the direction of torque transmitted by the second engagement element 80.

Returning to FIG. 3(a), the following description is given. The first concaves 64 each include a main body accommodation section 64a and an arm accommodation section 64b. The main body accommodation section 64a is a shallow dent for accommodating the main body 71 of the first engagement element 70. The arm accommodation section 64b is a shallow dent for accommodating the arm 72. The arm accommodation section 64b is connected to the main body accommodation section 64a. The first concaves 64 are disposed such that the arm accommodation sections 64b are oriented in the inward and outward radial directions while the main body accommodation sections 64a are arranged in the circumferential direction. The first concaves 64 are configured such that a spring accommodation section 64c, which is a deeper dent than the main body accommodation section 64a, is connected to the main body accommodation section 64a disposed opposite the arm accommodation section 64b. The spring 73 (see FIG. 1) is accommodated in the spring accommodation section 64c.

The second concaves 65 each include a main body accommodation section 65a and an arm accommodation section 65b. The main body accommodation section 65a is a shallow dent for accommodating the main body 81 of the second engagement element 80. The arm accommodation section 65b is a shallow dent for accommodating an arm 82. The arm accommodation section 65b is connected to the main body accommodation section 65a. The second concaves 65 are disposed such that the arm accommodation sections 65b are oriented in the inward and outward radial directions while the main body accommodation sections 65a are arranged in the circumferential direction. The second concaves 65 are configured such that a spring accommodation section 65c, which is a deeper dent than the main body accommodation section 65a, is connected to the main body accommodation section 65a disposed opposite the arm accommodation section 65b. The spring 83 (see FIG. 1) is accommodated in the spring accommodation section 65c. In the present embodiment, the springs 73, 83 are torsion coil springs. However, the present invention is not limited to such a configuration of the springs 73, 83. For example, compression coil springs may obviously be used instead of torsion coil springs.

The main body accommodation section 65a and arm accommodation section 65b of the second concaves 65 are disposed at positions opposing those of the main body accommodation section 64a and arm accommodation section 64b of the first concaves 64. Further, the main body accommodation section 65a and arm accommodation section 65b of the second concaves 65 are set to be greater in circumferential length than the main body accommodation section 64a and arm accommodation section 64b of the first concaves 64.

The second concaves 60 are configured so that a circumferentially extended, substantially arc-shaped groove 66 is formed on a radially inward portion of the second surface 61. The groove 66 is a region where a coil spring 96 (described later) is disposed. The coil spring 96 presses the restriction member 90 (described later) in one circumferential direction.

The restriction member 90 will now be described with reference to FIG. 4. FIG. 4(a) is a rear view of the second member 60 that is obtained by assembling the first engagement element 70, the second engagement element 80, and the restriction member 90. FIG. 4(b) is a rear view of the second member 60 that is obtained by assembling the first engagement element 70, the second engagement element 80, and the restriction member 90 and by sliding the restriction member 90. For ease of understanding, FIGS. 4(a) and 4(b) omit the spring accommodation sections 64c, 65c of the first concaves 64 and second concaves 65.

As illustrated in FIG. 4(a), the second member 60 is configured such that the first engagement element 70 and the second engagement element 80 are respectively disposed in the first concaves 64 and second concaves 65 formed on the second surface 61. The springs 73, 83 (see FIG. 1) accommodated in the first concaves 64 and the second concaves 65 respectively swing the first engagement element 70 and the second engagement element 80 around the arms 72, 82. As the main body accommodation section 65a and arm accommodation section 65b of the second concaves 65 are set to be greater in circumferential length than the main body accommodation section 64a and arm accommodation section 64b of the first concaves 64, the main body 81 and arm 82 of the second engagement element 80 are able to move circumferentially within the main body accommodation section 65a and the arm accommodation section 65b.

The restriction member 90 is a plate for restricting the swing of the first engagement element 70, and disposed between the second surface 61 of the second member 60 and the first surface 51 of the first member 50. The restriction member 90 includes a ring-shaped section 91, a plurality of first convexes 92 (four first convexes in the present embodiment), and a plurality of second convexes 94. The ring-shaped section 91 is shaped like a ring. The first convexes 92 protrude radially outward from the outer circumference of the ring-shaped section 91. The second convexes 94 protrude radially outward from the ring-shaped section 91 between the first convexes 92.

The first convexes 92 each include a locking section 93 that covers the main body 71 of the first engagement element 70 accommodated in the first concaves 64 to restrict the swing of the first engagement element 70. The locking section 93 is formed in a stepwise manner so as to be positioned slightly away in the axial direction from the ring-shaped section 91 and the first convexes 92 (positioned forward as viewed in FIG. 4(a)) by folding a radially outer portion of the first convexes 92 positioned in the same plane as the ring-shaped section 91. The second convexes 94 each include a contact section 95. The contact section 95 comes into contact with an arm 82 side end of the second engagement element 80 accommodated in the second concaves 65. The contact section 95 is formed on a circumferential edge of the second convexes 94.

The restriction member 90 is configured such that the radial lengths (outside diameters) of the first convexes 92 and second convexes 94 are set to be smaller than the inside diameter of the ring member 56 (see FIG. 1). This setup is performed to avoid interference between the restriction member 90 and the ring member 56.

The second member 60 is configured such that the coil spring 96 (see FIG. 6(a)) is disposed in the groove 66 (see FIG. 3(a)), which is formed on the radially inward portion of the second surface 61. A protrusion 97 (see FIG. 6(a)) is disposed on the ring-shaped section 91. The protrusion 97 protrudes axially from an axial end face. When the coil spring 96 presses the protrusion 97 in one circumferential direction (clockwise as viewed in FIG. 4(a)), the contact section 95 of the second convexes 94 comes into contact with a circumferential end face of the arm 82 of the second engagement element 80. This causes the second engagement element 80 to be pressed in the circumferential direction. The restriction member 90 stops at a position where the pressed second engagement element 80 comes into contact with a circumferential end of the second concaves 65. In this state, the main body 71 of the first engagement element 70 is covered with the locking section 93.

When a load is applied to the second engagement element 80 in the opposite circumferential direction (counterclockwise as viewed in FIG. 4(*b*)) as depicted in FIG. 4(*b*), the second engagement element 80 presses the contact section 95 brought into contact with the second engagement element 80. In a case where the applied load is greater than the force of the coil spring 96 (see FIG. 6(*a*)), the second engagement element 80 slides within the second concaves 65 so that the restriction member 90 rotates in the opposite circumferential direction (counterclockwise as viewed in FIG. 4(*b*)). This shifts the position of the locking section 93 in the opposite circumferential direction (counterclockwise as viewed in FIG. 4(*b*)). As a result, the first engagement element 70 is released from the locking section 93.

The dog clutch 40 will now be further described with reference to FIGS. 1 and 5. FIG. 5 is a cross-sectional view of the clutch 10. As depicted in FIG. 1, the first engagement element 70 and the spring 73 are accommodated in the first concaves 64 (see FIG. 3(*a*)) of the second member 60, and the second engagement element 80 and the spring 83 are accommodated in the second concaves 65 (see FIG. 3(*a*)). Meanwhile, the ring member 56 is accommodated in the groove 53 (see FIG. 2) of the first member 50. The first member 50 and the second member 60 are assembled in such a manner that the second surface 61 of the second member 60 faces the first surface 51 of the first member 50.

The transmission mechanism 100 transmits the output of the actuator 26 to the dog clutch 40. The actuator 26 and the transmission mechanism 100 form a drive device. The transmission mechanism 100 includes the ball cam 30, the pressure member 24, a pin 101, and a spring 103. The pin 101 transmits the force of the pressure member 24 to an operating member 102. The spring 103 presses the operating member 102 toward the first member 50. The pin 101 penetrates the second member 60 and the clutch hub 21 in the direction of the axis O. The spring 103 depresses the pins 57 toward the second member 60 through the operating member 102. The elastic force exerted in the direction of the axis O by the spring 103 is greater than the elastic force exerted in the direction of the axis O by the springs 73, 83. Therefore, in a state where the ring member 56 pressed by the pins 57 has entered the concaves 54, the first engagement element 70 and the second engagement element 80 are unable to enter the concaves 54.

Meanwhile, when the actuator 26 is operated to move the first plate 31 of the ball cam 30 toward the pressure member 24 as depicted in FIG. 5, the pressure member 24 is able to couple the input shaft 11 and the output shaft 12 by fastening the clutch plate 23. Further, the pressure member 24 moves the operating member 102 through the pin 101 while depressing the spring 103. This counteracts the elastic force of the spring 103 that acts on the ring member 56. Therefore, the springs 73, 83 cause the first engagement element 70 and the second engagement element 80 to enter the concaves 54.

The lengths in the direction of the axis O of parts, such as the pin 101 and the operating member 102, are set such that the second engagement element 80 is able to enter the concaves 54 (the second engagement element 80 is able to become engaged) before the clutch plate 23 is fastened to couple the input shaft 11 and the output shaft 12 and synchronize the first member 50 and the second member 60.

An operation of the dog clutch 40 will now be described with reference to FIGS. 6 and 7. FIG. 6(*a*) is a schematic diagram illustrating the dog clutch 40 in a state where the swing of the first engagement element 70 and second engagement element 80 is restricted. FIGS. 6(*b*) and 6(*c*) are schematic diagrams illustrating the dog clutch 40 in a state where the swing of the first engagement element 70 and second engagement element 80 is permitted.

FIG. 7(*a*) is a schematic diagram illustrating the dog clutch 40 with the second engagement element 80 engaged in the concaves 54. FIGS. 7(*b*) and 7(*c*) are schematic diagrams illustrating the dog clutch 40 in a state where the second member 60 relatively rotates in forward direction (in the direction of the arrows) with respect to the first member 50 while the swing of the first engagement element 70 and second engagement element 80 is permitted. For ease of understanding, FIGS. 6 and 7 depict some portions of the first member 50 and second member 60 in a simplified manner. The lengths of the arrows in FIGS. 6 and 7 indicate whether the forward rotation speeds of the first member 50 and second member 60 are high or low.

As illustrated in FIG. 6(*a*), the restriction member 90 pressed circumferentially by the coil spring 96 positions the locking section 93 between the first engagement element 70 and the first member 50 and brings the contact section 95 into contact with the second engagement element 80. The second engagement element 80 is then pressed circumferentially by the contact section 95 so that the arm 82 is fastened to the end of the arm accommodation section 65*b*. In a state where the ring member 56 has entered the concaves 54 of the first member 50, the first engagement element 70 and the second engagement element 80 are unable to enter the concaves 54 and become engaged. This interrupts the transmission of torque between the first member 50 and the second member 60.

In a state where the ring member 56 has exited the concaves 54 of the first member 50 as depicted in FIGS. 6(*b*) and 6(*c*), the second engagement element 80 swings. However, when the forward rotation speed of the second member 60 is higher than that of the first member 50, the second engagement element 80 is unable to become engaged in the concaves 54. This interrupts the transmission of torque between the first member 50 and the second member 60.

As depicted in FIG. 7(*a*), when the second engagement element 80 entering in the concaves 54 is pressed in the circumferential direction in a case where the forward rotation speed of the first member 50 is higher than that of the second member 60, the contact section 95 presses the restriction member 90 in the circumferential direction while depressing the coil spring 96. When the locking section 93 releases the first engagement element 70, the first engagement element 70 enters the concaves 54 and becomes engaged as depicted in FIG. 7(*c*). When the second member 60 drives in forward direction, the first member 50 is driven through the first engagement element 70 so that torque is transmitted from the second member 60 to the first member 50.

When the ring member 56 enters the concaves 54, the first and second engagement elements 70, 80 entering in the concaves 54 are able to exit the concaves 54 to interrupt the transmission of motive power between the first member 50 and the second member 60. The dog clutch 40 is a two-way clutch that causes the first engagement element 70 to transmit forward torque and causes the second engagement element 80 to transmit reverse torque.

An exemplary operation performed by the clutch 10 in a vehicle motive power transmission structure for inputting the torque of the engine 14 to the input shaft 11 of the clutch 10 and inputting the torque of the electric motor 15 to the output shaft 12 will now be described with reference to FIGS. 1 and 5.

When a vehicle starts running and runs at low or medium speed, the engine 14 stops to disengage the friction clutch 20 and dog clutch 40 of the clutch 10 as depicted in FIG. 1. This allows the vehicle to start and run by using the electric motor 15.

During an ordinary run, the actuator 26 is operated to move the pressure member 24 as depicted in FIG. 5 while the torque of the electric motor 15 is inputted to the output shaft 12. The pressure member 24 moves the operating member 102 through the pin 101 while depressing the spring 103. This counteracts the elastic force of the spring 103 that acts on the ring member 56. Therefore, the spring 83 causes the second engagement element 80 to enter the concaves 54.

When the pressure member 24 moves, the friction clutch 20 becomes engaged. While allowing the clutch plate 23 to slide, the friction clutch 20 smoothly transmits the torque of the electric motor 15 to the input shaft 11 from the output shaft 12 to which the torque of the electric motor 15 is inputted. When the friction clutch 20 is in a sliding state, the rotation speed of the first member 50 coupled to the output shaft 12 is higher than that of the second member 60 coupled to the input shaft 11. Therefore, the second engagement element 80 becomes engaged in the concaves 54. The second engagement element 80 pressed by the first member 50 presses the restriction member 90. As the locking section 93 positioned between the first engagement element 70 and the first member 50 moves out, the spring 73 causes the first engagement element 70 to enter the concaves 54. In this instance, no significant shock is created.

Next, the torque of the engine 14 is transmitted to the input shaft 11. When the rotation speed of the second member 60 to be coupled to the input shaft 11 is higher than that of the first member 50, the torque is transmitted from the second member 60 to the first member 50 through the first engagement element 70. Subsequently, in order to disengage the friction clutch 20, the actuator 26 is operated to return the pressure member 24 to its previous position. This allows the vehicle to run by using the engine 14 and the electric motor 15. In this instance, the electric motor 15 may be stopped to allow the vehicle to run by using the engine 14. In such a case, electric power can be generated by the stopped electric motor 15.

While the second member 60 drives to let the first engagement element 70 transmit torque, the elastic force of the spring 103 is unable to disengage the first engagement element 70. Therefore, even when the pressure member 24 returns to its previous position to disengage the friction clutch 20, the first engagement element 70 remains engaged. The role of the friction clutch 20 is to engage the first engagement element 70 by synchronizing the first member 50 and the second member 60. Therefore, after the first engagement element 70 is engaged, the friction clutch 20 may be disengaged. This makes it possible to reduce the time required for the actuator 26 to apply a load to the clutch plate 23. As a result, the energy consumed by the actuator 26 can be reduced.

The transmission mechanism 100 disables the first engagement element 70 and the second engagement element 80 from becoming engaged by causing the spring 103 to apply, to the first engagement element 70 and the second engagement element 80, an elastic force exerted in a direction opposite the direction in which the pressure member 24 moves to fasten the friction clutch 20. Therefore, while the friction clutch 20 is engaged, the first member 50 and the second member 60 are permitted to engage with the first engagement element 70 or the second engagement element 80. Further, while the first engagement element 70 or the second engagement element 80 is engaged with the first member 50 and the second member 60, the actuator 26 is unable to operate the first engagement element 70 and the second engagement element 80 in a state where the friction clutch 20 is disengaged. Therefore, when the first engagement element 70 and the second engagement element 80 become engaged, the first engagement element 70 and the second engagement element 80 are able to remain engaged without requiring the application of a pressure load to the friction clutch 20. This reduces the energy required for the engagement of the friction clutch 20.

When deceleration or braking is to be performed during an ordinary run, the engine 14 and the electric motor 15 are brought to a stop. A forward torque is transmitted from the first member 50, which is to be coupled to the output shaft 12, to the second member 60, which is to be coupled to the input shaft 11, through the second engagement element 80. When the rotation speed of the first member 50 is substantially equal to that of the second member 60, the elastic force of the spring 103 defeats the force with which the first and second engagement elements 70, 80 become engaged in the concaves 54 and the elastic force of the springs 73, 83. This presses the operating member 102, the pins 57, and the ring member 56 toward the second member 60, and causes the first and second engagement elements 70, 80 to exit the concaves 54. This makes it possible to prevent the torque of the output shaft 12 from being decreased by simultaneous rotation of the input shaft 11. Consequently, electric power loss can be reduced when electric power is generated by the output shaft 12 of the electric motor 15.

The clutch 10 is configured such that the actuator 26 operates the friction clutch 20 and the dog clutch 40 through the transmission mechanism 100. Therefore, a dedicated actuator is not required for each of the friction clutch 20 and the dog clutch 40. Consequently, it is possible to reduce the size and weight of the clutch 10 by an amount equivalent to the size and weight of an unused dedicated actuator.

While the present invention has been described in terms of an embodiment, it should be understood that the present invention is not limited to the above-described embodiment. Persons skilled in the art will easily appreciate that various modifications may be made without departing from the scope and spirit of the present invention. For example, the number and shape of the first and second engagement elements 70, 80 are merely illustrative and not restrictive, and may be set as appropriate.

The foregoing embodiment has been described on the assumption that a disc clutch is adopted as the friction clutch 20. However, the present invention is not limited to such a configuration. A different type of clutch may obviously be adopted as the friction clutch 20. For example, a drum clutch or a cone clutch may be used as the friction clutch 20. Further, although a case where a wet multi-plate clutch is adopted as the friction clutch 20 has been described, the present invention is not limited to such a configuration. For example, a dry clutch, a single-plate clutch, or a multi-disc clutch may obviously be adopted as the friction clutch 20. Furthermore, the friction clutch 20 described above functions when the electric motor 27 and the ball cam 30 are operated. However, the present invention is not limited to such a configuration. For example, a hydraulically-operated clutch, a pneumatically-operated clutch, or a solenoid or other electromagnetic clutch may obviously be adopted as the friction clutch 20.

The foregoing embodiment has been described on the assumption that the restriction member 90 for restricting the swing of the first engagement element 70 is disposed in the dog clutch 40. However, the present invention is not limited to such a configuration. The restriction member 90 may obviously be omitted from the dog clutch 40. In a case where the restriction member 90 is omitted, the circumferential length of the second concaves 65 is decreased to prevent the second engagement element 80 from sliding within the second concaves 65.

The foregoing embodiment has been described on the assumption that the first engagement element 70 and the second engagement element 80 are pressed in the direction of the axis O through the ring member 56. However, the present invention is not limited to such a configuration. The first engagement element 70 and the second engagement element 80 may obviously be pressed in the direction of the axis O through the pins 57 by omitting the ring member 56, changing the tip shape of the pins 57, and changing the shapes of the first and second engagement elements 70, 80.

The foregoing embodiment has been described on the assumption that the first engagement element 70 and the second engagement element 80 have the same shape. However, the present invention is not limited to such a configuration. The first engagement element 70 and the second engagement element 80 may obviously differ from each other in length, width, and thickness.

The invention claimed is:

1. A clutch for selectively transmitting or interrupting torque between an input shaft and an output shaft, the clutch comprising:
    a dog clutch that transmits forward or reverse torque from the input shaft to the output shaft; and
    a friction clutch that is disposed in parallel with the dog clutch and adapted to transmit torque from the input shaft to the output shaft,
    wherein the dog clutch includes:
        a first member that is to be coupled to the output shaft and has a first surface,
        a second member that is to be coupled to the input shaft and has a second surface, the second surface opposing the first surface in an axial direction,
        a first engagement element that is disposed between the first surface and the second surface and adapted to not only interrupt the transmission of reverse torque from the second member to the first member, but also engage the first member with the second member to transmit forward torque from the second member to the first member,
        a second engagement element that is disposed between the first surface and the second surface, and adapted to not only interrupt the transmission of forward torque from the second member to the first member, but also engage the first member with the second member to transmit reverse torque from the second member to the first member,
    springs that respectively press the first engagement element and the second engagement element in the axial direction in which the first engagement element and the second engagement element become engaged, and
    a drive device that elastically deforms the springs so as to disable the first engagement element and the second engagement element from becoming engaged.

2. The clutch according to claim 1, wherein the dog clutch includes a restriction member that, when the second member has a higher forward rotation speed than the first member, disables the first engagement element from becoming engaged and enables the second engagement element to become engaged, and when the first member has a higher forward rotation speed than the second member in a state where the second engagement element is engaged, enables the first engagement element to become engaged.

3. The clutch according to claim 1, wherein the drive device includes an actuator and a transmission mechanism, the transmission mechanism being adapted to transmit the output of the actuator to the springs and the friction clutch.

4. The clutch according to claim 3, wherein the drive device enables the second engagement element to become engaged, and then cancels the transmission of the output of the actuator to the friction clutch.

5. The clutch according to claim 3, wherein, while the first engagement element or the second engagement element is engaged with the first member and the second member, the transmission mechanism disables the drive device from operating the first engagement element and the second engagement element in a state where the friction clutch is disengaged.

6. A vehicle motive power transmission structure comprising:
    the clutch according to claim 1,
    wherein engine torque is inputted to the input shaft; and
    wherein electric motor torque is inputted to the output shaft.

* * * * *